United States Patent
Jones et al.

(10) Patent No.: US 7,410,174 B2
(45) Date of Patent: *Aug. 12, 2008

(54) RESTRAINING MECHANICAL JOINT GASKET FOR DUCTILE IRON PIPE

(75) Inventors: Jim Jones, Aledo, TX (US); Bradford G. Corbett, Jr., Fort Worth, TX (US)

(73) Assignee: S & B Technical Products, Inc., Fort Worth, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/070,554

(22) Filed: Mar. 2, 2005

(65) Prior Publication Data

US 2005/0194784 A1    Sep. 8, 2005

Related U.S. Application Data

(60) Provisional application No. 60/550,036, filed on Mar. 4, 2004.

(51) Int. Cl.
*F16J 15/02* (2006.01)
*F16L 19/08* (2006.01)

(52) U.S. Cl. .................. 277/615; 277/616; 277/627; 285/339

(58) Field of Classification Search ............ 277/611, 277/616, 624, 626, 627; 285/110–113, 339, 285/374
See application file for complete search history.

(56) References Cited

U.S. PATENT DOCUMENTS

| | | | | |
|---|---|---|---|---|
| 2,585,453 A * | 2/1952 | Gallagher et al. | ........... | 285/341 |
| 2,738,243 A * | 3/1956 | Sawyer | ........ | 277/495 |
| 2,966,539 A * | 12/1960 | Sears et al. | ........ | 174/47 |
| 3,874,709 A * | 4/1975 | MacDonald | ........ | 285/104 |
| 3,963,298 A * | 6/1976 | Seiler | ........ | 277/625 |
| 4,229,026 A * | 10/1980 | Seiler | ........ | 285/105 |
| 4,848,805 A * | 7/1989 | Bucher et al. | ........ | 285/105 |
| 5,058,907 A * | 10/1991 | Percebois et al. | ........ | 277/626 |
| 5,067,751 A * | 11/1991 | Walworth et al. | ........ | 285/105 |
| 5,094,467 A * | 3/1992 | Lagabe | ........ | 277/616 |
| 5,219,189 A * | 6/1993 | Demoisson et al. | ........ | 285/105 |
| 5,295,697 A * | 3/1994 | Weber et al. | ........ | 277/616 |
| 5,360,218 A * | 11/1994 | Percebois et al. | ........ | 277/619 |
| 5,464,228 A * | 11/1995 | Weber et al. | ........ | 277/615 |
| 5,779,285 A * | 7/1998 | Robison | ........ | 285/337 |
| 6,062,611 A * | 5/2000 | Percebois et al. | ........ | 285/374 |
| 6,220,635 B1 * | 4/2001 | Vitel et al. | ........ | 285/337 |
| 6,279,963 B1 * | 8/2001 | Hulsebos | ........ | 285/104 |
| 6,481,755 B2 * | 11/2002 | Hulsebos et al. | ........ | 285/104 |
| 6,488,319 B2 * | 12/2002 | Jones | ........ | 285/374 |
| 6,502,867 B2 * | 1/2003 | Holmes et al. | ........ | 285/337 |
| 6,688,652 B2 | 2/2004 | Holmes, IV et al. | ........ | 285/105 |
| 6,824,172 B1 * | 11/2004 | Komolrochanaporn | ........ | 285/340 |

(Continued)

*Primary Examiner*—Patricia Engle
*Assistant Examiner*—Gilbert Y Lee
(74) *Attorney, Agent, or Firm*—Charles D. Gunter, Jr.

(57) ABSTRACT

A restraining gasket for both sealing and preventing separation of a pipe joint used to join a bell end of a female ductile iron pipe to the male end of a mating ductile iron pipe. The gasket has a body formed from a compressible elastomeric material having a hardened metal ring located therein with gripping teeth. The hardened ring has an opening at one point in its circumference which is filled with rubber. The rubber-filled gap ensures that the gasket body seals first prior to engagement of the gripping teeth as the pipe joint is assembled.

6 Claims, 3 Drawing Sheets

U.S. PATENT DOCUMENTS

| | | | | |
|---|---|---|---|---|
| 6,945,570 B2* | 9/2005 | Jones | | 285/421 |
| 6,974,160 B2* | 12/2005 | Jones | | 285/337 |
| 7,093,863 B2* | 8/2006 | Holmes et al. | | 285/337 |
| 7,104,573 B2* | 9/2006 | Copeland | | 285/337 |
| 7,125,054 B2* | 10/2006 | Jones | | 285/337 |
| 2002/0158466 A1* | 10/2002 | Jones | | 285/105 |
| 2004/0075217 A1 | 4/2004 | Copeland | | 277/314 |
| 2004/0232698 A1* | 11/2004 | Jones | | 285/339 |
| 2004/0232699 A1* | 11/2004 | Jones | | 285/421 |
| 2004/0232700 A1* | 11/2004 | Jones | | 285/421 |
| 2005/0040645 A1* | 2/2005 | Jones | | 285/374 |
| 2005/0046189 A1* | 3/2005 | Corbett et al. | | 285/374 |

* cited by examiner

RESTRAINING MECHANICAL JOINT GASKET FOR DUCTILE IRON PIPE

A. CROSS-REFERENCE TO RELATED APPLICATIONS

The present application claims priority from provisional application, Ser. No. 60/550,036, filed Mar. 4, 2004, entitled "Restraining Mechanical Joint Gasket For Ductile Iron Pipe", by the same inventors.

BACKGROUND OF THE INVENTION

B. Field Of The Invention

The present invention relates generally to the field of pipe connections and to devices used in the pipeline construction industry. More particularly, this invention relates to a combination sealing and restraining gasket which is useful in forming a mechanical joint for ductile iron pipe.

B. Description of the Prior Art

Pipes are commonly used for the conveyance of fluids under pressure, as in city water lines. They may also be used as free-flowing conduits running partly full, as in drains and sewers. Pipes for conveying water in appreciable quantities have been made of steel, cast iron, concrete, vitrified clay, and most recently, plastic including the various polyolefins and PVC.

In many applications where pipes are joined in telescoping relationship, the spigot end of one pipe is inserted into the socket end of the engaging pipe. The socket end has an opening large enough to receive the spigot end of the mating pipe. Often times, the materials being transported are fluid or gaseous in nature, and, particularly in those circumstances, it is desired that the pipeline be impervious to leaks. In order to accomplish that goal, and to achieve other objectives which will be herein described, those skilled in the business of pipe and pipeline construction are constantly in search of improved means for securing the joints formed by connecting the ends of pipe together. There are numerous methods currently in use by those in the pipe and pipeline construction industry to obtain a secure joint. These methods employ different types of components and also can be distinguished by the various ways in which such components are employed. The selection of these different methods will usually depend on the overall design requirements of the pipeline. In any event, a gasket is typically present within the socket end of the pipe which is intended to prevent leakage of fluid from the joint by forming a seal between the two pipe sections.

In addition to the necessity of providing an effective seal at the pipe joint, another important design requirement exists when it becomes necessary to join the pipe components in a restrained manner. This is usually desired in order to prevent the pipe components from separating due to thrust forces that often occur when the pipeline is subjected to internal pressure, and sometimes, when earth tremors or other external factors come into play.

In the case of existing iron pipelines, the devices for joining pipe have included the use of flanged fittings which are of appropriate diameter and which are fitted onto pipe ends in facing relationship to one another. In some cases, a sealing gasket is employed between the faces of the flanged fittings to obtain a sealed joint. This is usually accomplished by bolting the flanged fittings together. In the case of iron pipe, set screws are sometimes inserted radially through the collar of the flange into the exterior surface of the pipe ends in order to secure the flanged fitting to the pipe ends. The set screws thus functioned to some extent as a restraint system for the pipe joint.

A particularly preferred method of forming a sealed joint in the iron pipe industry utilizing a sealing "gland" is sometimes referred to as a "mechanical joint" or simply as an "MJ". The bell end of an iron pipe section has a flanged portion cast on it. The spigot end of a second iron pipe is fitted with a slidable gland fitting and a gasket that is conically shaped such that one face of the gasket is diametrically larger than the second face of the gasket. The conically shaped gasket is positioned between the gland fitting and the spigot end of the pipe with the smaller, second face of the gasket being closer to the spigot end than the larger, first face of the gasket. The gland fitting has a plurality of apertures for receiving standard bolts. The joint is formed when the spigot is axially inserted into the bell, and the gland fitting and the flanged portion are bolted together, causing the lip of the gland fitting to compress the gasket thus sealing the two pipe pieces.

While the gasket used in the traditional MJ design for ductile iron pipe served to seal the joint, the gasket did not feature a cooperating "restraint" feature in order to assure the greater integrity of the joint of pipe.

A need exists, accordingly, for a gasket design for a mechanical joint for ductile iron pipe which offers complimentary sealing and self restraining features.

A need also exists for such a system which is cost-effective, easy to manufacture and easy to use in the field and which is extremely dependable in operation.

A need also exists for such a system which effectively restrains ductile iron pipe against internal and external forces at a pipe or fitting connection and which effectively joins and seals at least two pipes to form a pipeline.

A need also exists for such a system which can be utilized without the need for external mechanical restraints which are formed of metallic components which would be subject to corrosion in use.

SUMMARY OF THE INVENTION

The self-restrained pressure gasket of the invention is intended to be inserted within an annular groove provided in a bell end opening of a female ductile iron pipe and is capable of both joining and sealing the female ductile iron pipe to a mating male ductile iron pipe having an interior surface and an exterior surface. The gasket is formed with an annular gasket body made of a resilient elastomeric material and has an inner circumferential region and an outer circumferential region. A segmented ring which is preferably formed of a plurality of hardened ring segments is integrally molded within the material of the gasket body so that the ring segments are at least partially embedded within the resilient elastomeric material. Each of the ring segments has an inner circumferential surface, an outer circumferential surface, front and rear end faces and opposing sides. At least one row of teeth is located on the inner circumferential surface of at least selected ones of the ring segments for engaging selected points on the exterior surface of the mating male ductile iron pipe. The ring segments are located within the annular gasket body with the inner circumferential surfaces thereof initially forming an acute angle with respect to the exterior surface of the mating male pipe section. Preferably, a plurality of rows of teeth are located on the inner circumferential surface of at least selected ones of the ring segments. The acute angle which is formed between the inner circumferential surface of the ring segments and the inner circumferential region of the gasket is in the range from about 5 to 20 degrees so that the teeth do not initially engage the exterior surface of the mating male pipe.

In another embodiment of the invention, the hardened ring is preferably made in one piece with only a single slit along the circumference thereof to allow for expansion and contraction. In this case, the ring preferably rests within a pocket formed in the rubber of the gasket body, thereby allowing some expansion and contraction of the ring, for example, to allow the gasket to slipover the male pipe end.

The restraining mechanism of the invention can thus comprise a wedge segment or segments or a gripping ring having a slit at one point along the circumference thereof and can be integrated into the design of the mechanical joint gasket. As the gasket is activated, multiple wedging action (wedges) or compression forces (gripping ring) is imparted against the mating spigot pipe end, increasing its resistance to movement as internal pressure increases. The wedge segments or gripping rings are preferably heat treated to at least about 370 Brinell hardness so that the devices penetrate the spigot pipe outer surface or form a buttress on the pipe surface.

The self-restrained gasket of the invention is used to form a pipe joint including a female ductile iron pipe having a bell end opening with an annual groove for receiving a sealing gasket as previously described. The bell end opening is sized to receive the male spigot end of a mating ductile iron pipe. The self-restrained pressure gasket is located within the annular groove provided in the bell end opening of the female ductile iron pipe. The mating ductile iron pipe is inserted into the bell end opening of the female ductile iron pipe with the male and female pipes being aligned along a central axis with at least selected teeth of the hardened ring segments being initially angled away from the outer surface of the male ductile iron pipe. The teeth of the annular gasket are forced into engagement with the exterior surface of the male ductile iron pipe as the pipe joint is assembled by means of a force applied to the rear end face of the ring segments. This force causes the teeth to be forced downwardly in the direction of the exterior surface of the mating male pipe so that the teeth grip the exterior pipe surface. The teeth are oriented to allow movement of the male pipe in a first direction relative to the female bell end opening during the assembly process but to resist movement in a opposite direction once the pipe joint is made up.

Additional objects, features and advantages will be apparent in the written description which follows.

DETAILED DESCRIPTION OF THE INVENTION

Figure 1:
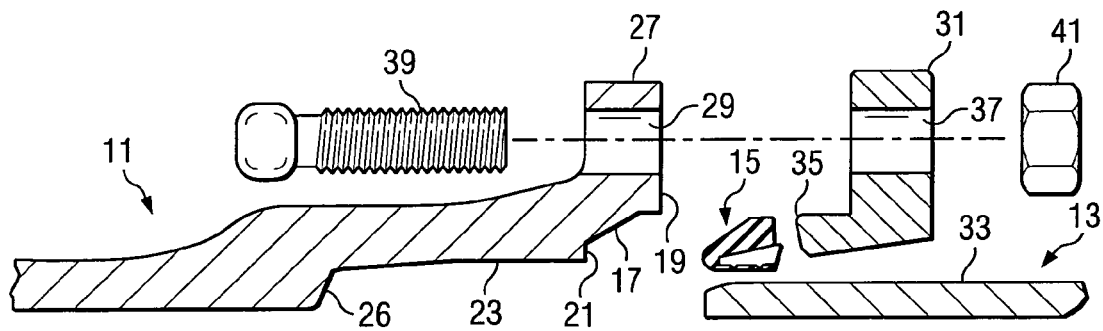
FIG. 1 is a horizontal, quarter sectional view of a pipe joint of the invention, the joint being shown in exploded fashion for ease of illustration.

In one field of use, the present invention deals with mechanical joints used to join sections of pipe to form a pipeline of the type used in water, sewage, and other municipal fluid conveyance systems. Such pipelines have traditionally been formed of ferrous metal. By "ferrous metal" is meant iron and alloys of iron. For example, one type of ferrous metal which is commonly encountered in the waterworks industry is "ductile iron". This particular type of metal is widely used because it offers a combination of a wide range of high strength, wear resistance, fatigue resistance, toughness and ductility in addition to the well-known advantages of cast iron—castability, machinability, damping properties, and economy of production. It takes its name from the fact that it is "ductile" in nature, rather than being brittle, as was the case with earlier cast iron products and materials. Today, grades of ductile iron are available offering the option of choosing high ductility, with grades guaranteeing more than 18% elongation, or high strength, with tensile strengths exceeding 120 ksi (825 MPa). Austempered ductile iron (ADI), offers even greater mechanical properties and wear resistance, providing tensile strengths exceeding 230 ksi (1600 MPa).

In forming a pipeline of ductile iron components, one end of each section is typically enlarged, forming a "bell" at one end sufficiently to join the next adjacent pipe section by receiving in the belled end the unenlarged or "spigot" end of the next adjacent length of pipe within the bell end opening. The inside diameter of the bell is formed sufficiently large to receive the spigot end of the next section of pipe with sufficient clearance to allow the application of an elastomeric gasket or other sealing device designed to prevent leakage at pipe joints when a plurality of pipe lengths are joined to form a pipeline.

Ductile iron pipes of the above type have, for many years, been joined by utilizing an elastomeric gasket which is compressed between the inside walls of the bell and the outside wall of the plain or beveled end of the spigot end of the next pipe in a series of telescoped pipes. The gasket is typically retained within a groove provided in the bell end opening of the female pipe section. One problem which exists, however, is finding a way to "restrain" the assembled pipe joint so that the joint will not separate due to internal or external pressure, or due to environmental factors such as earth movement.

As mentioned in the background discussion of the invention, the iron pipe industry has addressed the problem of providing a restrained pipe joint by utilizing a sealing "gland" and fitting, sometimes referred to as a "mechanical joint" or simply as an "MJ". The bell end of an iron pipe section has a flanged portion cast on it. The spigot end of a second iron pipe is fitted with a slidable gland fitting and a gasket that is conically shaped. The conically shaped gasket is positioned between the gland fitting and the spigot end of the pipe. The gland fitting has a plurality of apertures for receiving standard bolts. The joint is formed when the spigot is axially inserted into the bell, and the gland fitting and the flanged portion are bolted together, causing the lip of the gland fitting to compress the gasket thus sealing the two sections of pipe.

One object of the present invention is to provide an improved self-restraining gasket which can be used in a variety of sealing situations. In other words, the gasket of the invention might be used in a standard ductile iron pipe joint to join a belled pipe end to a mating plain end male pipe. Alternatively, the gasket of the invention might be used as the sealing element in a "fitting" which is used to make up a joint between two plain end pipe sections. In a particularly preferred form of the invention, the gasket of the invention is used to make up a mechanical joint of the type used in traditional cast iron pipe joints.

In the preferred embodiment illustrated in FIG. 1, there is shown a joint is to be formed between a pipe bell end 11 of one ductile iron pipe and plain spigot end 13 of a second ductile iron pipe. The second pipe 13 is to be inserted into the belled end 11 of the enclosing pipe. The gasket 15 of the present invention is shown in exploded fashion with the other components of the pipe joint in FIG. 1.

Figure 2:
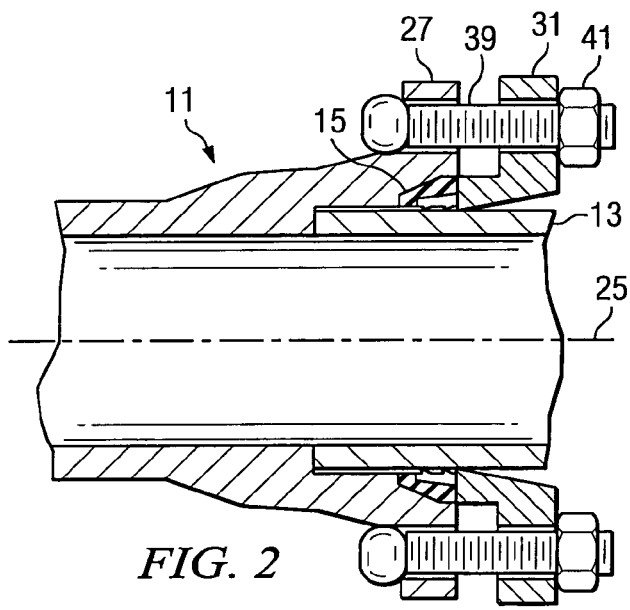
FIG. 2 is again a horizontal sectional view of the pipe joint of the invention, with the joint being shown in the assembled condition.

The inner surface of the pipe bell end 11 has a retainer groove 17 for retaining the gasket 15. The groove 17 is bounded by a front wall 19 and by a retainer wall 21. In addition, the bell pipe end has a throat region 23 which extends longitudinally inwardly parallel to the pipe axis 25 and joins a shoulder region 26. The bell pipe end 11 also has a flanged collar region 27 which includes a plurality of apertures 29. A circumferential gland fitting 31 is sized to be received about an outer surface 33 of the mating male ductile iron pipe 13. The gland fitting 33 has a forward lip region 35 which contacts and compresses the body of the gasket 15 as the joint is assembled (see FIG. 2). The gland fitting 31 also has a plurality of apertures 37 which are arranged to be aligned with the apertures in the flange collar region 27 of the bell end. A bolting means such as bolts 39 and nuts 41 are used to join the apertures of the bell pipe end and the gland fitting as shown in FIG. 2.

Figure 3:
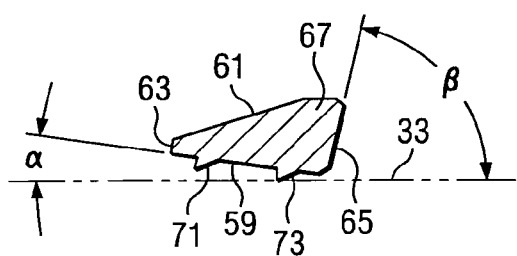
FIG. 3 is an isolated, cross sectional view of one of the hardened ring segments used in the self-restraining gasket of the present invention.
Figure 4:
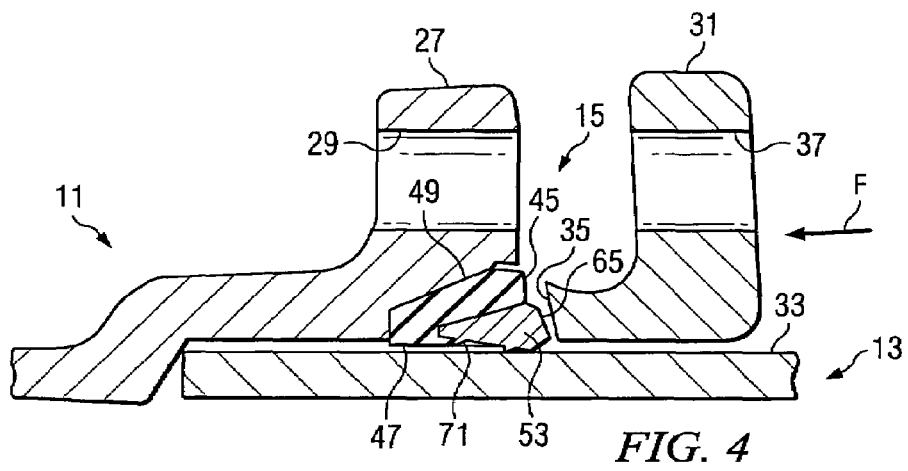
FIG. 4 is another horizontal, quarter sectional view of the pipe joint of the invention showing the assembly of the gland fitting which is used to make up the joint and with the gland fitting spaced slightly apart from the self-restraining gasket for ease of illustration.
Figure 5:
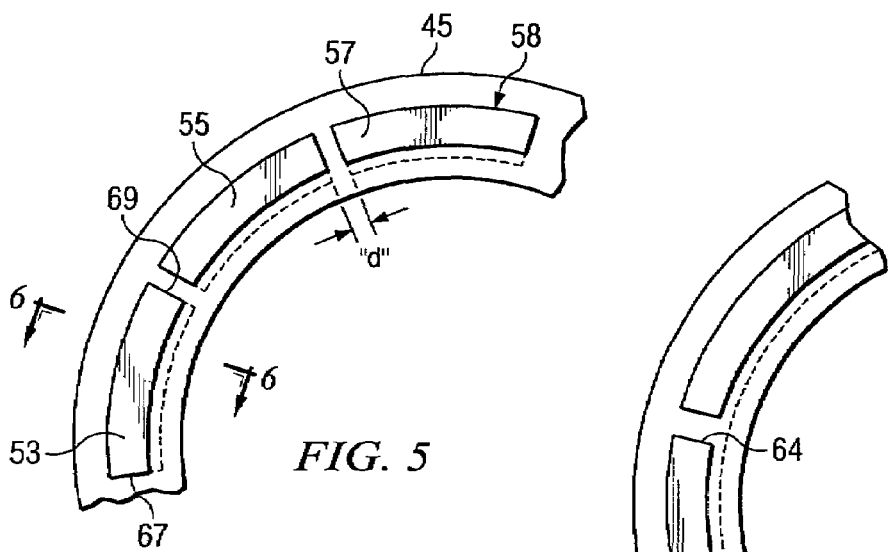
FIG. 5 is a quarter sectional plan view of the layout of one embodiment of the gripping segments in the self-restraining gasket of the invention showing the gap between the respective gripping segments.

As shown in FIGS. 3-5, the self-restrained pressure gasket 15 includes an annular gasket body 45 made of a resilient elastomeric material, such as a suitable natural or synthetic rubber. The annular gasket body 45 has an inner circumferential region 47 and a sloping outer circumferential region 49. The gasket body 45 is generally cone shaped, as view in cross section in FIG. 4. While the preferred gasket body is shown as being conical in cross section, it will be understood that other gasket body shapes can be envisioned such a plain O-ring, or modified O-ring cross section, or even a flanged gasket.

Figure 8:
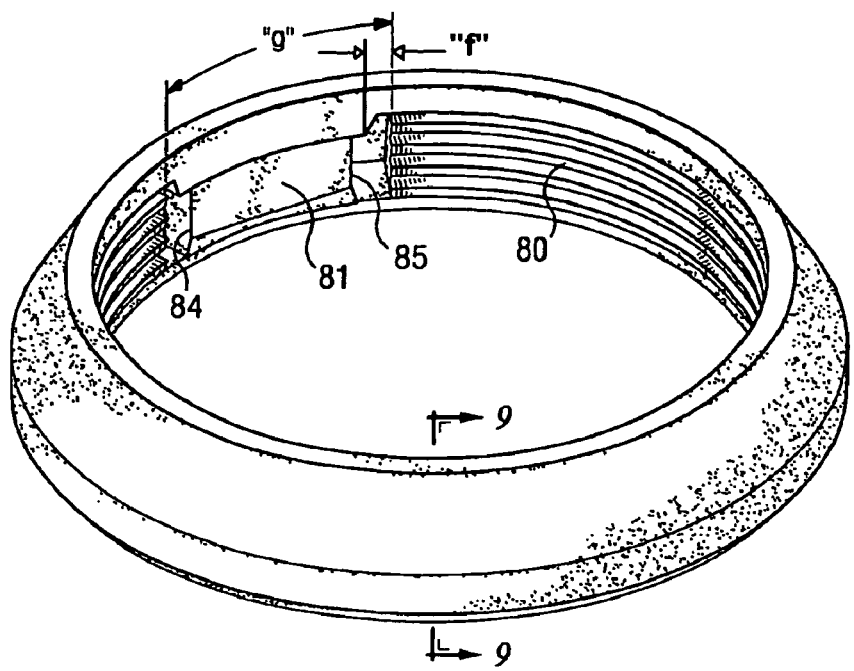
FIG. 8 is a perspective view of an embodiment of the self-restraining gasket of the invention in which a solid gripping ring having a single slit along the circumference is used.

A segmented ring (generally at 58 in FIG. 5) formed of a plurality of hardened ring segments (53, 55, 57 shown) is present within the gasket body. Preferably, the segmented ring 57 is integrally molded within the material of the gasket body 45 so that the ring segments 53 are at least partially embedded within the resilient elastomeric material. The ring segments are preferably either bonded to the rubber of the gasket body during the curing or manufacturing process, or are held in place by a suitable adhesive or by other mechanical means. FIG. 8 shows a plurality of ring segments 53a, 55a, 57a which have dovetail regions 58 for mechanically restraining the ring segments within the gasket body.

Figure 6:
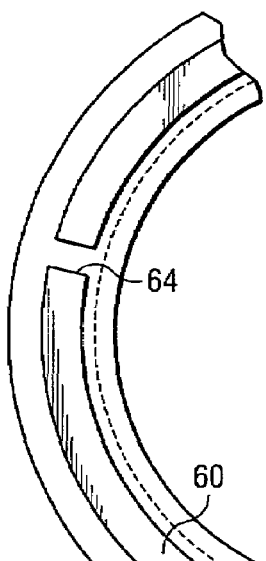
FIG. 6 is an isolated, cross sectional view of the self-restraining gasket of FIG. 5, taken along lines VI-VI in FIG. 5.

Each of the ring segments 53, is shown in FIG. 3, has an inner circumferential surface 59, and outer circumferential surface 61, front and rear end faces 63, 65 and opposing sides 67, 69. At least one row of teeth 71 are located on the inner circumferential surface 59 of at least selected ones of the ring segments 53 for engaging selected points on the exterior surface 33 of the mating male ductile iron pipe 13. In the preferred embodiment illustrated in FIG. 3, the ring segments 53 have two parallel rows 71, 73 of teeth located on the inner circumferential surface 59 of at least selected ones of the ring segments. The rows of teeth 71, 73 may be completely encapsulated within the elastomeric material of the gasket 45 or may be partially exposed therefrom. Preferably, as shown in FIG. 6, the teeth 71, 73 are initially covered by the rubber material of the gasket body. As shown in FIG. 6, the rear end face 65 of the segment 53 protrudes slightly from the resilient elastomeric material 35 of the gasket body in the embodiment illustrated.

The ring segments 53 can be formed of a suitable metal or alloy such as copper, aluminum or stainless steel as well as various hardened polymers, ceramics, composite materials, and the like. Preferably, the ring segments 53 are formed of steel or similar hardened metal which have been heat treated to at least about 370 Brinell hardness (BHN) so that the teeth of the ring segments can penetrate the spigot pipe exterior surface or form a buttress on the pipe surface. Also, the number of rows of teeth and the number of teeth in each row can vary according to the particular end application for the sealing gasket. The rows of teeth on each ring segment can also contain teeth of uneven length which may be spaced evenly or unevenly across the inner circumferential surface 59 thereof.

As illustrated in the embodiment of the invention shown in FIGS. 3 and 4, the ring segments 53 are located within the annular gasket body 45 with the inner circumferential region 59 thereof forming an acute angle $\alpha$ with respect to the exterior surface 33 of the mating male pipe section (illustrated by phantom lines in FIG. 3), or to the pipe axis 25. In the preferred embodiment illustrated, the acute angle $\alpha$ is in the range from about 5° to 20°, most preferably about 7° to 10°. Note also that, in the embodiment illustrated, the rear end face 65 of the ring segment also forms an acute angle $\beta$ in the range of about 65° to 85° with respect to the surface 33. As the gland fitting contacts the gasket, the fitting lip region 35 and the gasket rear end face 65 will form complimentary mating surfaces.

Because of the orientation of the ring segments 53 within the gasket body, the rows of teeth 71, 73 do not bite into the pipe exterior surface 33 until the joint is assembled. In other words, some compression of the gasket body 45 is necessary before the teeth 71, 73 are forced to rotate downwardly in the direction of the top arrow over the angle $\alpha$ shown in FIG. 3 and therefore in the direction of the pipe exterior 33. With reference to FIG. 4, as the gland fitting 31 is moved in the direction of the flange collar region 27 of the bell pipe end, the lip region 35 of the gland fitting contacts the rear end face 65 of the segment 53 causing the teeth 71, 73 to be rotated downwardly in the direction of the pipe exterior surface 33. This action causes the rows of teeth 71, 73 to actually protrude through the rubber of the gasket body 45 and bite into the exterior surface of the mating male pipe section 33. Note that in FIG. 4, the gland fitting 31 is shown slightly spaced apart from the flanged collar region 27 for ease of illustration. The ring segment 53 is shown rotated downwardly to contact the male pipe exterior surface 33 as it would be during the initial stage of contact by the gland fitting 31.

As illustrated in FIG. 5, the ring segments (53, 55, 57, illustrated) completely circumscribe the gasket with only a slight gap or distance (illustrated as "d" in FIG. 5) between the ring segments. Thus, each of the segments is separated by the gap "d" when the gasket is in the relaxed state shown in FIG. 5. When the joint is assembled, the gaps close up, allowing near or complete 360° contact of the gripping segments about the periphery of the gasket. The gap or gaps ("d" in FIG. 5)

prevent the teeth of the gripping segments from engaging the outer surface of the male ductile iron pipe prematurely, i.e., until the gasket has been compressed enough to create the seal. As a result, the pipe seal is generally made before the teeth of the gripping segments contact the male pipe outer surface. It will also be apparent to those skilled in the relevant art that the ring segments can be of various lengths with some segments having teeth and others being plain. Contact between the ring segments sets up an interference or radial force component so that the device cannot be over tightened.

Figure 7:
FIG. 7 is a view similar to FIG. 5, but showing a gripping ring which has one slit along the circumference thereof.

FIG. 7 shows another embodiment of the invention in which a hardened ring 60 is located within the rubber gasket body 62. In this case, the ring 60 is a single piece ring having only a single slit 64 at one circumferential location to allow for expansion and contraction. The width of the slit 64 can vary, depending partly upon the pipe size being coupled. In this embodiment of the invention, the hardened ring 60 preferably sits within a suitably formed "pocket" in the gasket body. This arrangement allows some movement of the hardened ring 60 within the pocket to allow for expansion and contraction, for example, to allow the gasket to slip over the male pipe end. As in the case of the ring segments 53, the single piece ring is formed of steel or similar hardened metal which has been heat treated to at least about 370 Brinell hardness (BHN) so that the teeth of the ring can penetrate the spigot pipe exterior surface or form a buttress on the pipe surface.

Figure 9:
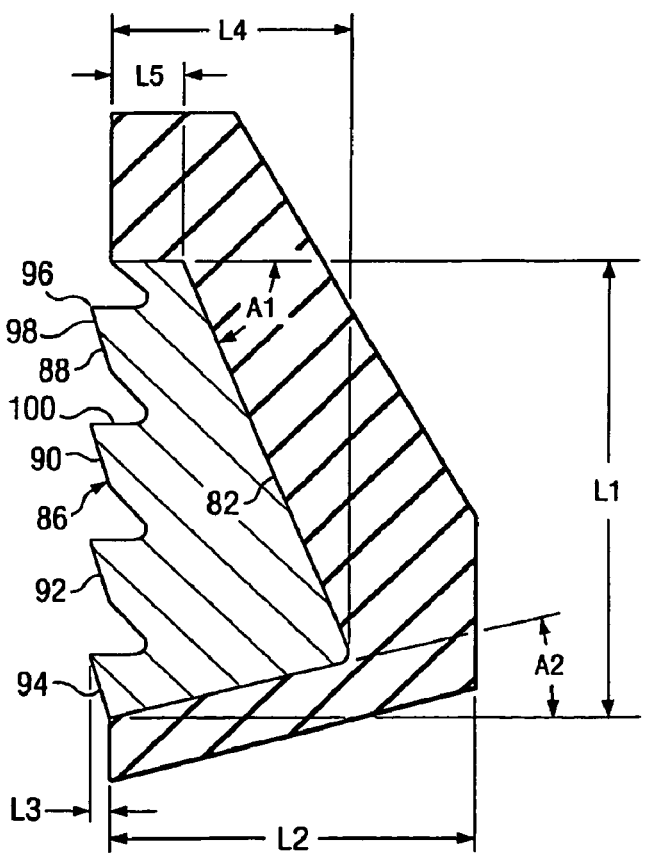
FIG. 9 is a cross sectional view of the self-restraining gasket of the invention taken along lines IX-IX in FIG. 8.

FIG. 8 is a perspective view of a version of the embodiment of the invention, similar to FIG. 7, in which a relatively rigid ring 80 is located within a recess or pocket (82 in FIG. 9). As viewed in cross section, the ring 80 is generally wedge shaped, increasing in width from the top to the bottom as viewed in FIG. 9. The relatively rigid ring can be formed of any suitable hard material such as cast iron or metal alloy such as copper, aluminum or stainless steel as well as various hardened polymers, ceramics, composite materials, and the like. Again, the ring 80 is a single piece ring having only a single slit or opening 84 at one circumferential location to allow for expansion and contraction. For example, the overall "gap", indicated by "g" in FIG. 8, allows the ring 80 to slip over the mating male pipe end during assembly of the pipe joint. The slit in the ring illustrated at 64 in FIG. 7 was relatively small, allowing the opposing faces of the ring to actually make interfering contact during assembly of the pipe joint. The overall gap "g" in FIG. 8, on the other hand, is relatively large and can vary, for example, on the order of $\frac{1}{32}$ to $\frac{1}{4}$ of the total inner circumferential area of the gasket body.

The gap "g" is quite sizable in the embodiment of the invention shown in FIG. 8, comprising on the order of $\frac{1}{8}$ of the total circumference of the gasket body. The larger gap distance requires ever greater pressure to push the gap toward a closed position during joint make up and ensures that the gasket body seals first prior to engagement of the gripping teeth to restrain the joint in position. The gap could be left "open", or could be filled with rubber, depending upon the end application of the restraining gasket. In the particular embodiment illustrated in FIG. 8, the gap "g" is filled with a mass of rubber 81 which has opposite end regions 84, 85 which are contacted by the opposing ring faces as the joint is assembled. The end regions 84, 85 are initially spaced apart from the opposing ring faces by a distance of about $\frac{1}{4}$ to $\frac{3}{8}$ inch for 4 inch to 12 inch diameter pipe.

As a result, a secondary gap ("f" in FIG. 8) exists between the opposing ring face and the opposite end regions (85 in FIG. 8) of the mass of rubber 81. It will be appreciated from FIG. 8 that, since the ring 80 sits in a "pocket" within the gasket body, that the opposing ring faces can be evenly spaced from the end regions of the mass of rubber 81 to, in effect, create two secondary gaps "f", or the ring can be pushed up against one of the rubber end regions 84, 85 so that one secondary gap "f" exists. Whether one or two gaps "f" exists, the overall secondary gap distance "f" is the same, i.e., about $\frac{1}{4}$ inch to $\frac{3}{8}$ inch for a 4 inch to 12 inch diameter pipe.

The two gaps "f" and "g" cooperate in a two step process during assembly of the pipe joint. The first gap "g" allows the rigid ring 80 to slip over the mating male plastic pipe. The secondary gap "f" ensures the seal is effected prior to the rigid ring 80 engaging the exterior surface of the mating male iron pipe. The rubber "partition" 81 also helps to prevent point loading and pipe distortion. During installation, the gasket is compressed by the mating gland fitting 31, i.e., by mechanical means. The secondary gap "f" is not closed until a proper seal is maintained by the elastomeric material of the gasket body.

As shown in FIG. 9, the inner circumferential surface 86 of the ring 80 has a plurality of circumferential rows of gripping teeth, in this case rows 88, 90, 92, 94. Each tooth, such as tooth 88 in FIG. 12, has an apex 96 and an inclined crest region 98 which, in turn, is joined to a cavity or trough region 100. The cavity or trough region 100 forms a reduction of inside contact area for the gripping teeth on the outer surface of the mating male pipe end during the make up of the pipe joint. The particular design of the gripping teeth, as shown in FIG. 12, helps to ensure that the sealing surfaces of the gasket body make contact with the mating male pipe surfaces first, followed by engagement of the gripping teeth to perform the restraining function. This action is critical in proper make up of the joint, since the reverse order of operation might stop the make up of the pipe sections prematurely, prior to proper sealing engagement.

With reference to FIG. 12, for a 6 inch sealing gasket, the relatively rigid ring has the following exemplary dimensions where the lengths are given in millimeters and the angles are given in degrees:

| Ring Material | L1 | L2 | L3 | L4 | L5 | A1 | A2 |
|---|---|---|---|---|---|---|---|
| Cast iron | 20.00 | 8.30 | 1.00 | 6.00 | 2.20 | 69.0 | 16.0 |

An invention has been provided with several advantages. The self-restrained pressure gasket of the invention is capable of joining and sealing the female bell pipe end of a ductile iron pipe to a mating male spigot end of a second ductile iron pipe. When the self-restrained pressure gasket is used as a part of a mechanical joint, a self-restrained joint is provided for ductile iron pipe which equals or exceeds the self-restraining and sealing capabilities of the prior art cast iron pipe systems. The system of the invention is simple in design and economical to manufacture and does not require any drastic changes in existing ductile iron components. In some applications, the self-restrained gasket of the invention can be used to join ductile iron pipe without the need for external mechanical restrain components which complicate assembly and can be subject to corrosion or deterioration in use.

While the invention has been shown in only two of its forms, it is not thus limited but is susceptible to various changes and modifications without departing from the spirit thereof.

We claim:

1. A self-restrained pressure gasket for insertion within a circumferential recess provided in a bell end opening of a female ductile iron pipe capable of both joining and sealing the female ductile iron pipe to a mating male ductile iron pipe having an interior surface and an exterior surface to create a sealed pipe joint, the gasket comprising:

an annular gasket body made of a resilient elastomeric material, the annular gasket body having an inner circumferential region and an outer circumferential region, the inner circumferential region having a circumferential recess located thereon;

a relatively rigid split ring located on the inner circumferential region of the gasket body within the circumferential recess of the gasket body, the ring having an inner circumferential surface, an outer circumferential surface and one opening at one circumferential location which creates one overall gap between opposing faces of the ring so that the opposing faces of the ring are spaced apart by a predetermined distance when the gasket is in a relaxed state, wherein the predetermined distance between the opposing faces of the ring which creates the overall gap in the ring can vary from about $1/32$ to about $1/4$ of the total inner circumferential region of the gasket body;

at least one row of gripping teeth located on the inner circumferential surface of the relatively rigid ring for engaging selected points on the exterior surface of the mating male iron pipe;

wherein the overall gap between the opposing faces of the relatively rigid ring is at least partly filled with a mass of rubber having opposite end regions which form a rubber partition between the opposing faces of the ring, and wherein the opposing faces of the relatively rigid ring are spaced apart from at least one of the rubber end regions by a secondary gap in a relaxed state prior to assembly of the pipe joint; and wherein the overall gap in the ring closes by a predetermined amount as the pipe joint is assembled, the distance between the opposing faces of the ring being selected to prevent the gripping teeth from engaging and biting into the exterior surface of the male iron pipe prematurely before the gasket has been compressed enough to create a seal.

2. The self-restrained pressure gasket of claim 1, wherein the ring is located within the circumferential recess provided in the elastomeric material of the inner circumferential region of the gasket body, whereby the ring is allowed limited movement during expansion and contraction of the gasket, the inner circumferential surface of the ring being at least partly exposed from the material of the gasket body, and wherein the overall gap in the ring is a sizable gap on the order of $1/8$ of the total inner circumferential region of the gasket body.

3. The self-restrained gasket of claim 2, wherein the ring can be removed and then re-installed within the circumferential recess on the inner circumferential region of the gasket body.

4. The self-restrained gasket of claim 1, wherein the relatively rigid ring is formed of hardened steel which has been heat treated to at least about 370 Brinell hardness (BHN) so that the teeth of the ring can penetrate the male pipe exterior surface or form a buttress on the pipe surface.

5. A self-restrained pressure gasket for insertion within a circumferential recess provided in a bell end opening of a female ductile iron pipe capable of both joining and sealing the female ductile iron pipe to a mating male ductile iron pipe having an interior surface and an exterior surface to create a sealed pipe joint, the gasket comprising:

an annular gasket body made of a resilient elastomeric material, the annular gasket body having an inner circumferential region and an outer circumferential region, the inner circumferential region having a circumferential recess located thereon;

a relatively rigid split ring located on the inner circumferential region of the gasket body within the circumferential recess of the gasket body, the ring having an inner circumferential surface, an outer circumferential surface and one opening at one circumferential location which creates one overall gap between opposing faces of the ring so that the opposing faces of the ring are spaced apart by a predetermined distance when the gasket is in a relaxed state, wherein the predetermined distance between the opposing faces of the ring which creates the overall gap in the ring can vary from about $1/32$ to about $1/4$ of the total inner circumferential region of the gasket body;

at least one row of gripping teeth located on the inner circumferential surface of the relatively rigid ring for engaging selected points on the exterior surface of the mating male iron pipe;

wherein the overall gap between the opposing faces of the relatively rigid ring is at least partly filled with a mass of rubber having opposite end regions which form a rubber partition between the opposing faces of the ring, and wherein the opposing faces of the relatively rigid ring are spaced apart from at least one of the rubber end regions by a secondary gap in a relaxed state prior to assembly of the pipe joint;

wherein the overall gap in the ring closes by a predetermined amount as the pipe joint is assembled, the distance between the opposing faces of the ring being selected to prevent the gripping teeth from engaging and biting into the exterior surface of the male iron pipe prematurely before the gasket has been compressed enough to create a seal;

wherein the ring is generally wedge shaped in cross section, and wherein the inner circumferential surface of the relatively rigid ring has a plurality of circumferential rows of gripping teeth and wherein each of the teeth in the row of teeth has an apex and an inclined crest region which, in turn, leads to a circumferential cavity between the inclined crest region and an apex of a next adjacent tooth, the cavities forming a reduction in an inside contact area for the gripping teeth on the outer surface of the mating male pipe end during make up of a pipe joint.

6. The self-restrained gasket of claim 5, wherein the secondary gap is on the order of $1/4$ inch to $3/8$ inch for 4 inch to 12 inch diameter mating male iron pipe members.

* * * * *